United States Patent [19]

Wong

[11] Patent Number: 4,800,576

[45] Date of Patent: Jan. 24, 1989

[54] CONVOLUTION DATA RECOVERY CIRCUIT

[75] Inventor: Hee Wong, San Jose, Calif.

[73] Assignee: National Semiconductor Corporation, Santa Clara, Calif.

[21] Appl. No.: 21,407

[22] Filed: Mar. 4, 1987

[51] Int. Cl.$^4$ ............................................. H04L 27/22
[52] U.S. Cl. ........................................... 375/83; 375/84
[58] Field of Search ....................... 375/80, 83, 84, 85, 375/96, 103; 371/43

[56] References Cited

U.S. PATENT DOCUMENTS

| | | | |
|---|---|---|---|
| 4,302,845 | 11/1981 | McClaughry et al. | 375/83 |
| 4,379,284 | 4/1983 | Boykin | 375/83 |
| 4,466,108 | 8/1984 | Rhodes | 375/83 |
| 4,646,173 | 2/1987 | Kammeyer et al. | 375/103 |
| 4,648,098 | 3/1987 | Kerr | 375/47 |

Primary Examiner—Robert L. Griffin
Assistant Examiner—Marianne Huseman
Attorney, Agent, or Firm—Limbach, Limbach & Sutton

[57] ABSTRACT

In a receiver of the type that receives an incoming phase shift keying (PSK) signal and recovers data therefrom, a data recovery circuit which utilizes convolution techniques. The data recovery circuit generates an array of phase vectors representative of the incoming PSK signal and convolutes the vectors against a weighting curve to generate binary weighted outputs. The magnitude of the outputs represents one of the phases of the incoming PSK signal. If the incoming phase is undefined, the binary weighted outputs are not updated.

9 Claims, 6 Drawing Sheets

FIG_1

CONVOLUTION DATA RECOVERY CIRCUIT

BACKGROUND OF THE INVENTION

1. Field of the Invention

The present invention relates to telecommunications systems and, in particular, to a differential dibit phase shift keying (DBSK) data recovery circuit which utilizes a convolution technique to generate decoded data outputs.

2. Discussion of the Prior Art

The basic function of a communications system is to transmit information from a source to a destination as fast and as accurately as possible. The source and destination are physically separated from one another and are connected by a communications channel.

There are two types of information sources: analog information sources and discrete information sources. Analog sources, such as a microphone, produce a continuous amplitude signal. Discrete sources, such as a digital computer, generate a signal consisting of a sequence of characters. Analog signals can be converted to discrete signals by utilizing sampling and quantizing techniques.

Communications channels which are designed to handle voice transmission (i.e., the telephone network) have characteristics which make it difficult for them to transmit binary digits or bit streams. To permit the transmission of digital data over a voice channel, it is necessary to utilize the digital data to modulate a carrier waveform having a frequency which is compatible with the voice channel.

The equipment which performs the required modulation is generally referred to as "modem". The term "modem" is an acronym for MOdulator-DEModulator since the equipment typically includes the capability not only to modulate transmitted signals but also to demodulate received signals.

Generally speaking, as stated above, a modulator receives a serial digital data bit stream from an information source and converts the bit stream to a waveform suitable for transmission over the communication channel. In addition to matching the frequency spectrum of the transmitted signal with the characteristics of the communication channel, the modulator also serves to minimize the effect of signal distortion caused by noise and by the non-ideal nature of the communications channel.

At the receiver end of the communications system, the transmitted signal is demodulated; that is, the transmitted data is separated or recovered from the modulated carrier waveform.

For communication systems that use higher data rates, i.e., 1200 baud or greater, various forms of phase shift keying (PSK) modulation are utilized.

A 2-phase PSK modulation system uses one phase of the carrier frequency for one binary state and the other phase for the other binary state. The two phases are 180° apart and are detected by a synchronous recovery device using a reference signal at the receiver which is of known phase with respect to the incoming signal.

A differentially coherent PSK (DPSK) modulation scheme eliminates the need for a reference signal at the receiver. In a DPSK scheme, the phase reference for demodulation is derived from the phase of the carrier waveform during the preceding signaling interval. The receiver recovers the digital information based on the phase differential.

In one type of four-phase DPSK signalling scheme, the binary data to be transmitted is grouped into blocks of two bits called dibits. The resulting four possible dibit combinations, i.e. 00, 01, 10 and 11, differentially phase modulate the carrier waveform. The receiver produces two outputs which are proportional to the phase difference in the transmitted signals. The input bits are uniquely recovered based on the characteristics of the two outputs. The recovered dibits are then converted to a serial binary output.

Generally speaking, convolution is a mathematical operation which is used to "smooth" or "average" functions of the same variable.

Conventional DBPSK recovery circuits require A/D converters. In addition, these digital data processing techniques are expensive because of their high power consumption and very high system toggling frequencies which result in heavy investments in RFI shieldings.

SUMMARY OF THE INVENTION

It is an object of the present invention to provide a differential dibit PSK (DBPSK) data recovery circuit that utilizes a convolution technique.

It is an object of the present invention to provide a DBPSK data recovery circuit with no trimming requirements.

It is an object of the present invention to provide a DBPSK data recovery circuit which is highly integratable.

These and other objects of the present invention are accomplished by providing a data recovery circuit which utilizes convolution techniques to decode an incoming PSK signal. In the embodiment of the invention described below, the incoming signal is a 4-phase differentially coherent dibit PSK signal. The data recovery circuit generates an array of phase vectors representative of the incoming PSK signal. The phase vectors are convoluted against a weighting curve to generate decoded outputs representative of the phase of the incoming signal.

These and other features and advantages of the present invention will be appreciated by reference to the detailed description of the invention provided below which should be considered in conjunction with the accompanying drawings.

DETAILED DESCRIPTION OF A PREFERRED EMBODIMENT

Figure 1:
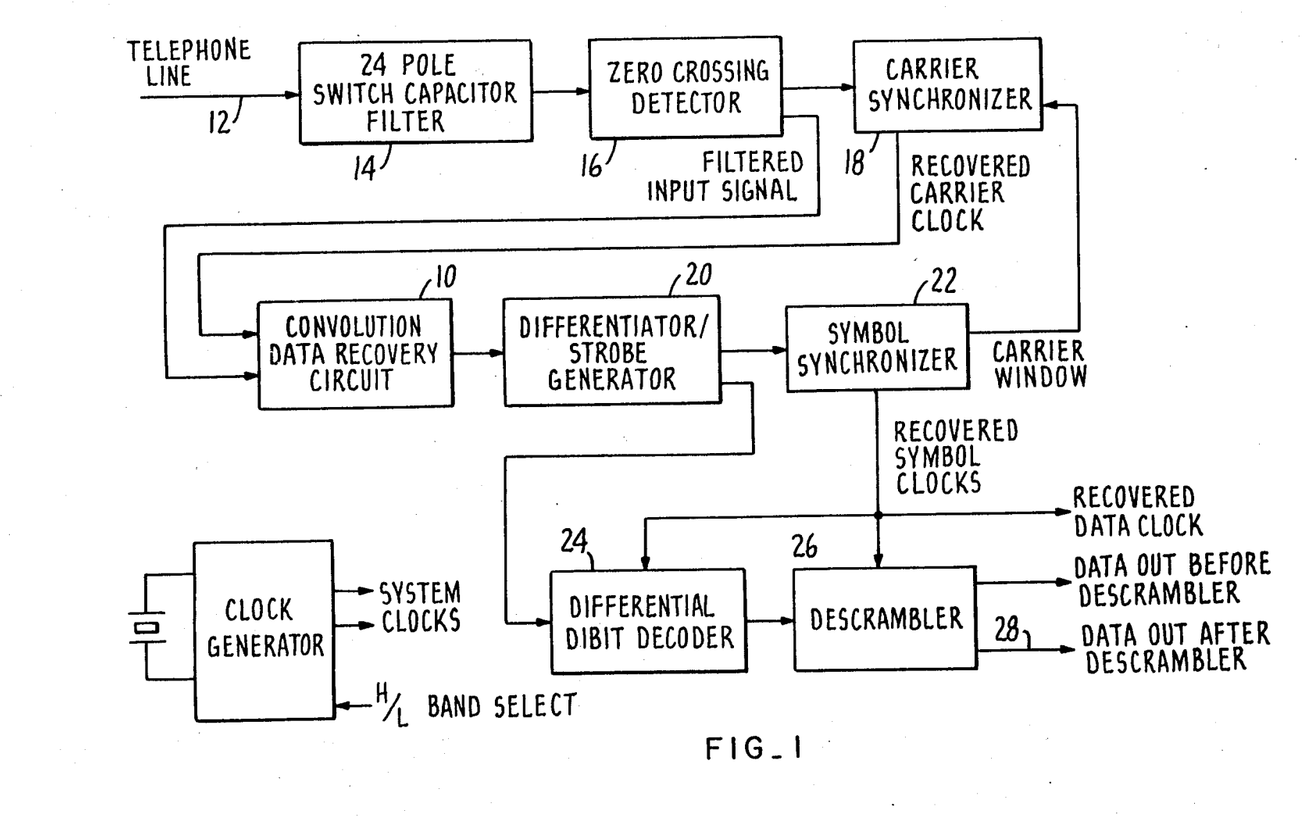
FIG. 1 is a schematic block diagram illustrating a receiver which utilizes a convolution data recovery circuit in accordance with the present invention.

FIG. 1 shows a block diagram of a receiver circuit. FIGS. 2A-2D provide an actual circuit implementation of the receiver shown in FIG. 1, including a convolution data recovery circuit 10 in accordance with the present invention.

As shown in FIG. 1, an incoming PSK signal 12 is received from a telephone line by a switch capacitor filter 14 which generates an output to a zero crossing detector 16. The zero crossing detector 16 determines the zero crossings occurring in the incoming modulated dibit PSK signal and provides both a filtered signal to the convolution data recovery circuit 10 as well as carrier synchronization strobes to a carrier synchronizer 18. The carrier synchronizer 18 recovers the carrier clock and provides it as a second input to the data recovery circuit 10. The decoded outputs of the data recovery circuit 10 are provided to a differentiator/strobe generator 20. The differentiator/strobe generator 20 provides as outputs both the strobes to a symbol synchronizer 22 and the PSK dibit signal to a differential dibit decoder 24. The symbol synchronizer 22 generates three outputs: (i) a carrier window gating signal which is used by carrier synchronizer 18, (ii) recovered symbol clocks which are used to clock the dibit decoder 24 and a descrambler 26, and (iii) the recovered data clock. The differential dibit decoder 24 provides a bit stream to the descrambler 26 which sequences the bit stream to provide the recovered data output signal 28.

Figure 2A:
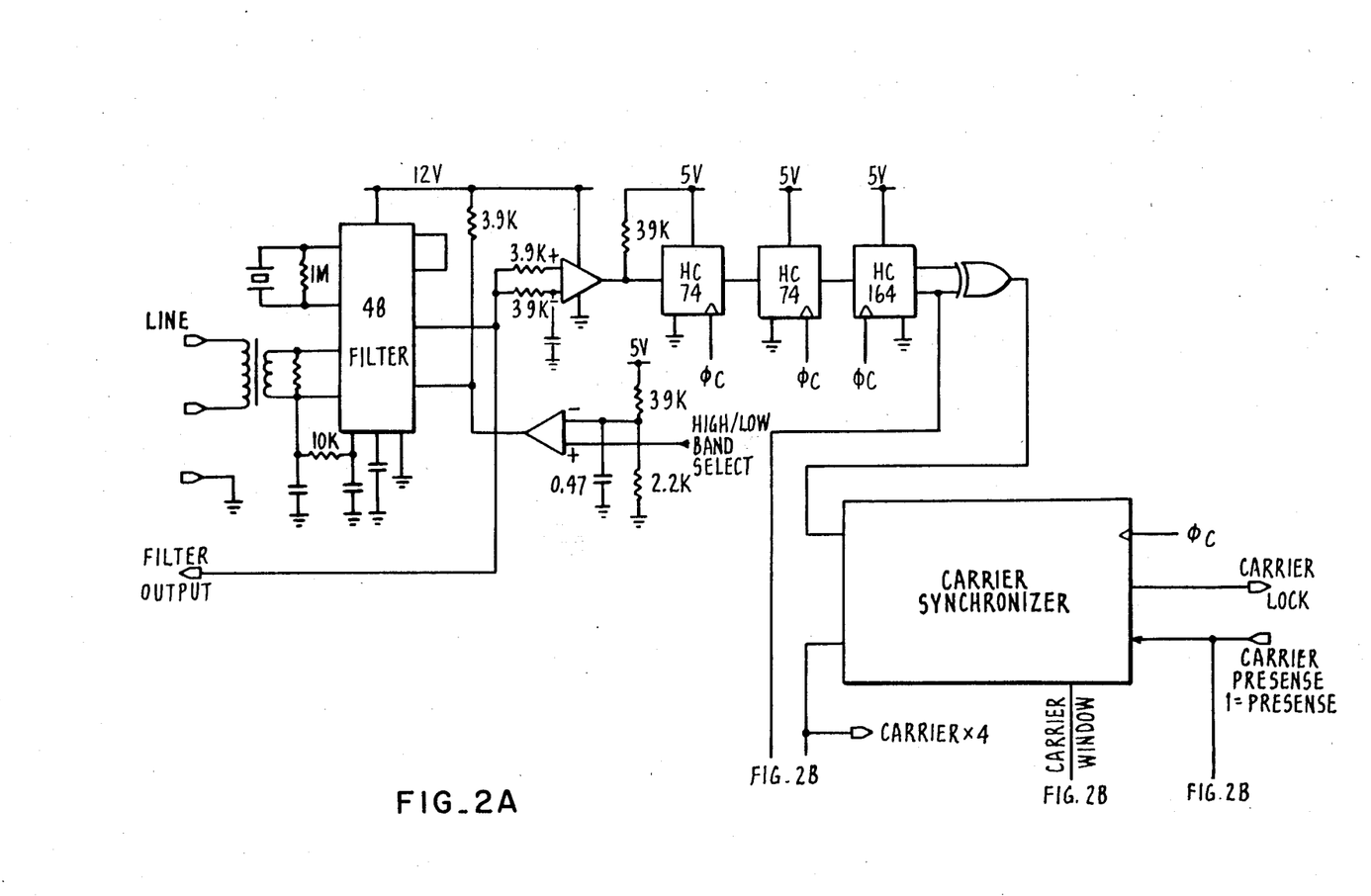
FIGS. 2A-2D combine to provide a schematic diagram illustrating a receiver circuit which includes a convolution data recovery circuit in accordance with the present invention.
Figure 2B:
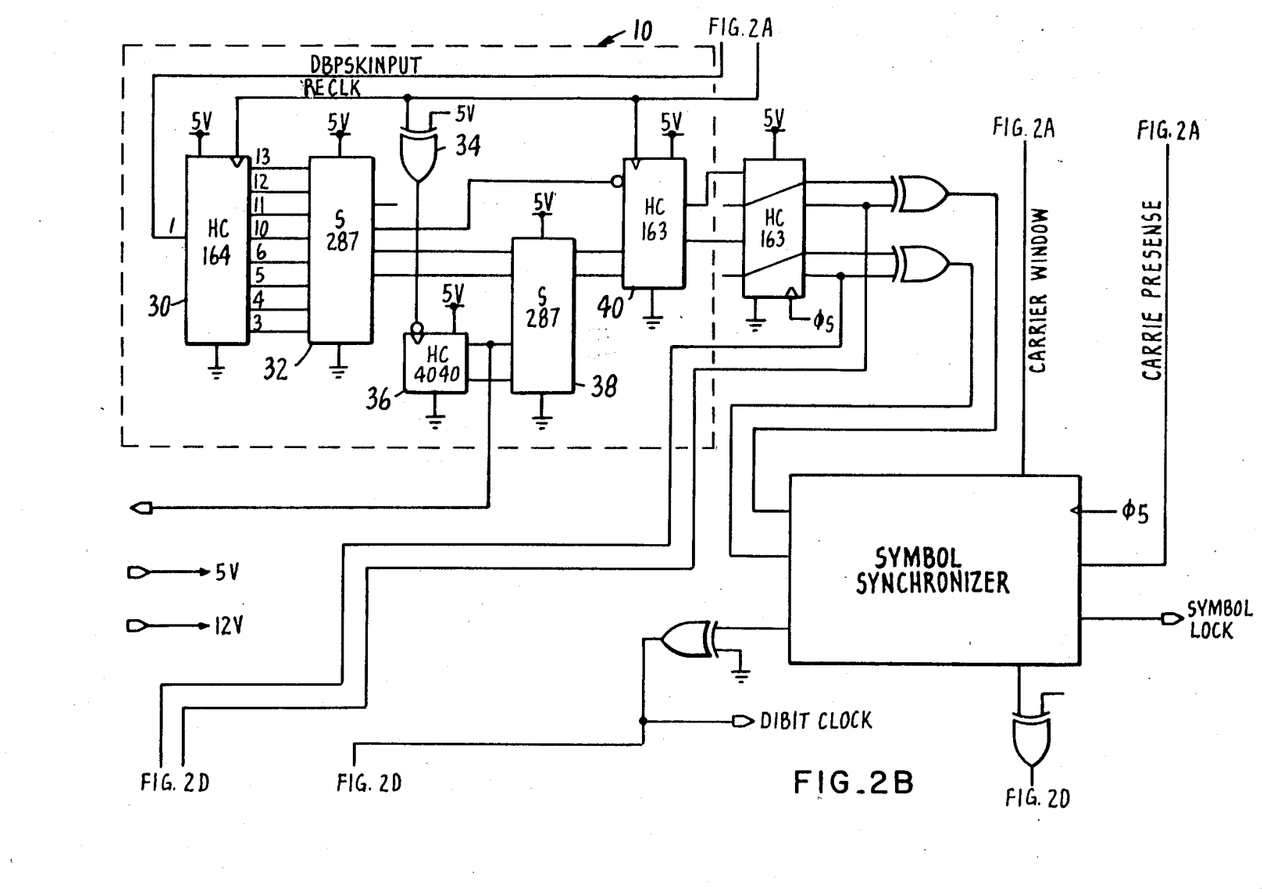
Figure 2C:
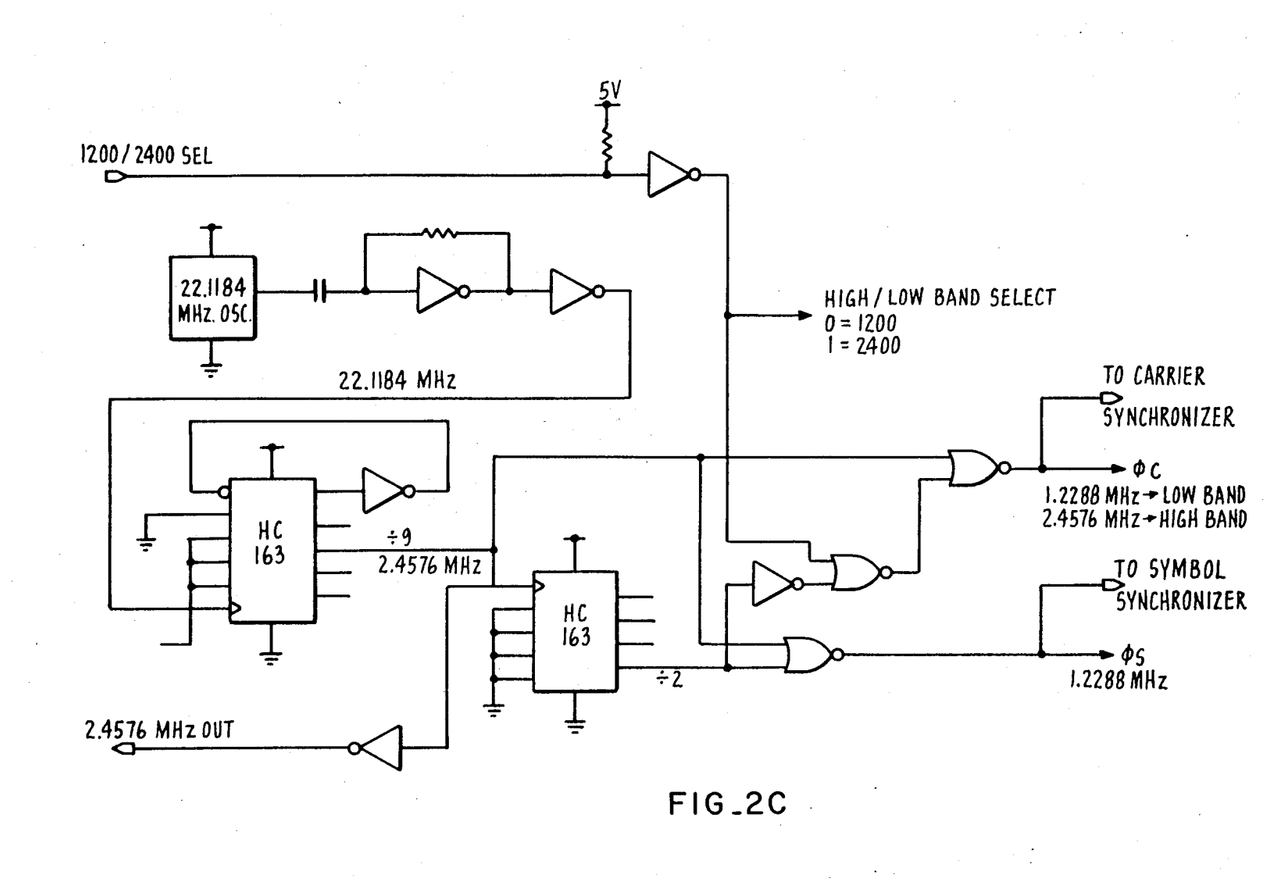

Referring to FIG. 2B, the convolution data recovery circuit 10 of the present invention includes an 8-bit shift register 30, a 256×3 ROM 32, XOR gate 34, a 2-bit divider 36, a 16×2 ROM 38 and a two-bit gated "D" flip-flop 40.

The data recovery circuit 10 has two input requirements. A filtered DBPSK input signal provided by zero crossing detector 16 feeds the "D" input terminal of shift register 30. A recovered carrier clock signal RECLK generator by carrier synchronizer 18 runs at four times the carrier frequency of the DBPSK input signal.

The frequency of the RECLK signal is about 4.8 KHz for the low-band and 9.6 KHz for the high band. Its positive going edges are aligned to the 45°, 135°, 225°, 315° points of the incoming carrier waveform.

Figure 3:
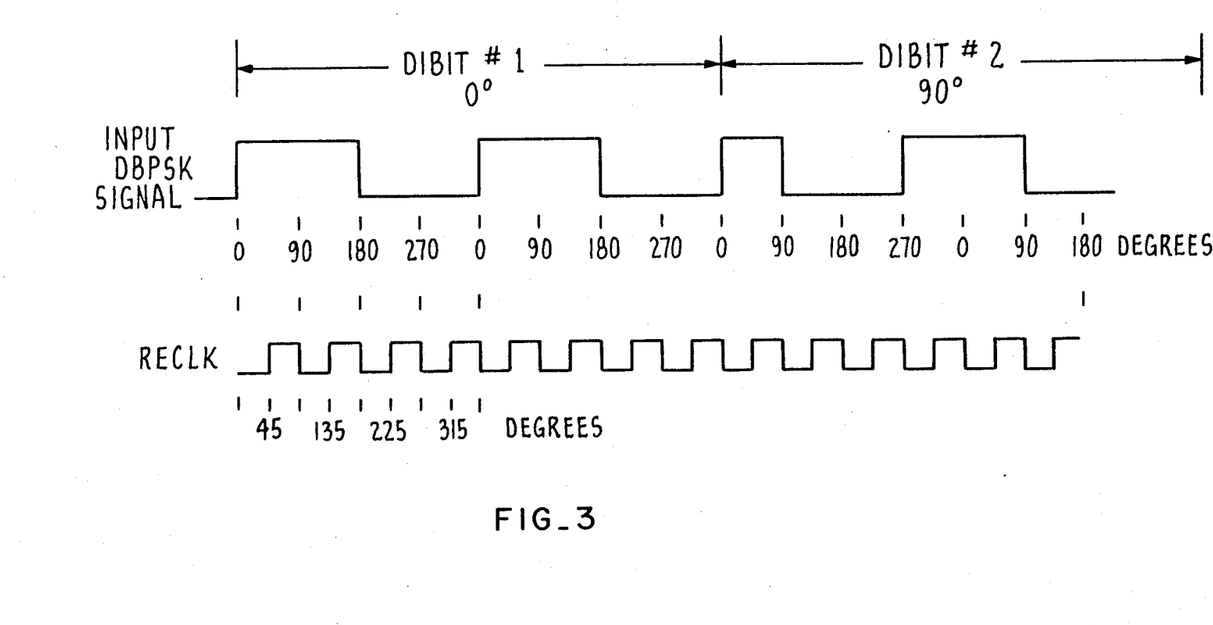
FIG. 3 is a timing diagram illustrating the phase relationship between an incoming DBPSK signal and a 4x carrier clock.

A timing diagram illustrating the phase relationship between the incoming DBPSK signal and the recovered RECLK signal is provided in FIG. 3. The RECLK signal is used to clock the three flip-flops 30, 36 and 40 of the convolution data recovery circuit 10.

The decoded outputs of the data recovery circuit 10 are available at the two output terminals of flip-flop 40. These two outputs are binary weighted; the magnitude of the outputs represents one of the four phases of the incoming DBPSK signal. Since the DBPSK input is differentially coded, the absolute magnitude does not represent the actual input phasing.

Referring back to FIG. 1, the differential decoding is performed by a differential dibit decoder 24. As stated above, the output of decoder 24 provides a serial bit stream to a descrambler 26.

Differential/strobe generator 20 senses the code changes of the decoded outputs from the data recovery circuit 10 and generates "symbol synchronizing strobes" for the symbol synchronizer 22.

Figure 2D:
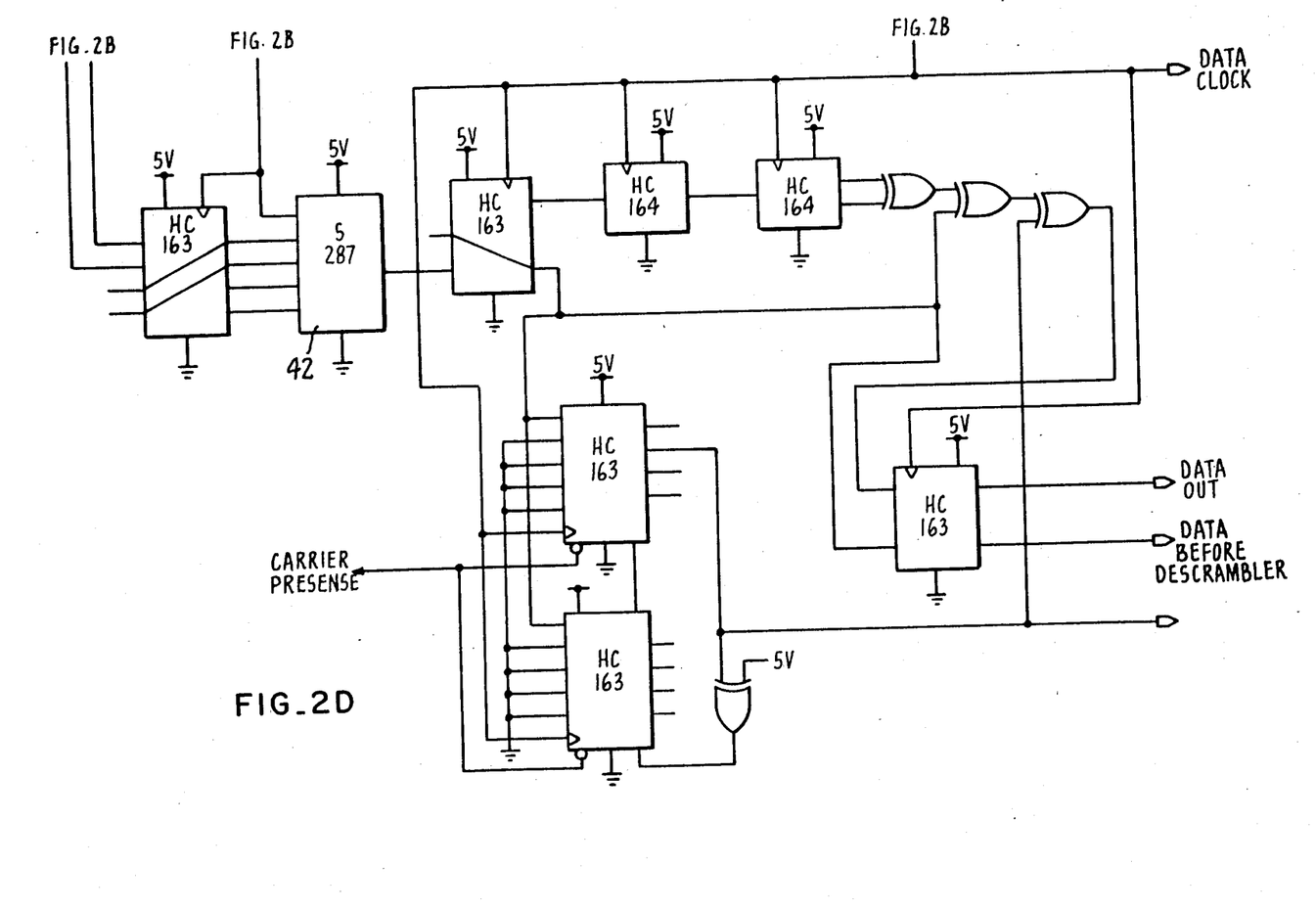

All circuits after the outputs of data recovery circuit 10 are beyond the scope of the present invention. Hence, the details are not included in this description. However, the source listing "DPD.BAS" of the differential decoder ROM, designated item 42 in FIG. 2D, is provided as Appendix A at the end of this specification.

Referring back to FIG. 2B, the 4x clock signal RECLK connected to 8-bit shift register 30 shifts the incoming DBPSK signal into the shift register 30 which generates a phase vector array at its eight outputs (pins 3–6 and 10–13). These vectors are convoluted against a weighting curve "CDR1.BAS" pre-stored in 256×3 ROM 32. The source listing of program "CDR1.BAS" of ROM 32 is provided in Appendix B at the end of this specification. The CDR1.BAS program is organized as follows:

| | |
|---|---|
| 1000 | title of the file |
| 1010 | defines all the variables used in the program. |
| 1020 | reads the numbers contained in the data area (#1290) into the "X" array. The numbers are generated from the impulse response characteristic of the data transmitter. Programs named "IMPUL.BAS" and "CIW.BAS" in Appendix B are for this purpose. |
| 1030 | builds up the complete "X" array from the one-sided weighting numbers. |
| 1040 | finds the mid-point of the sum of the two-sided weightings. This number sets the decision level of the phase comparator during the phase estimation process. |
| 1050 & 1260 | form a loop which scans all of the 256 locations of ROM 32. |
| 1070 to 1120 | fill the "P" array by masking the inputs of ROM 32 with a 2-bit overlapping interval. Since there are 8 inputs to ROM 32, there will be 7 elements in the "P" array. A carrier removal process is inserted by subtracting the term "B and 3" from the masked values in statement 1100. Each number stored in the "P" array is a 2-bit number designating the incoming phase at that interval. |
| 1140 to 1170 | apply a weighting function to the "P" array and pick out the phase that bears the maximum weighting. |
| 1180 | checks whether the maximum weighting is exceeding the half point; if not, a number "4" is decoded. The number "4" will prevent flip-flop 40 from updating to the invalid codes. |
| 1190 to 1250 | print out the variables. |
| 1270 to 1280 | send the resulting ROM codes to a file for PROM programming purpose. |

A sample run of the CDR1.BAS program provides an insight into the coding algorithm. The data provided in Appendix C at the end of this specification is obtained by executing the program. The line starting with "33" under the column "ROM ADR" is an obvious example that the decoded phase is "0". Since the input contains a hexadecimal code "33", ("00110011" when expressed in binary form), ROM 32 will treat the code as a continuous carrier without modulation. In this case, all the numbers stored in the "P" array are "0's", and of course, the maximum weighting after summation will be devoted to the "phase 0".

A second example is the case when "ROM ADR" equals 3, the phase vector "0" in the "P" array has the highest weighting, so the output phase is estimated to be "0".

The carrier removal process described above assumes a fixed carrier phase to be subtracted from the vectors (statement #1100). Since the vectors are continuously shifting into the register, the decoded output phase will rotate at the clock rate. This can be easily seen by sequentially applying the following codes to the circuit:

33,66,99,CC,33 . . . and so on.

The removal of the rotating patterns is performed by counter 36 and ROM 38. Counter 36 is a two-bit divider which provides the reference carrier phase to ROM 38. ROM 38 is a 16×2 ROM which is coded according to the "CDR2.BAS" listing provided in Appendix B at the end of this specification. Statement #1060 is the only key statement which denotes that the output is the difference between the input phase and the reference carrier phase.

Flip-flop 40 prevents invalid codes from leaving the data recovery circuit 10.

The length of the shift register 30 covers the whole dibit period of the incoming DBPSK signal when the circuit operates at the low band frequency. In the high band mode, the circuit tends to generate less error due to the fact that there are twice the number of carrier cycles to define a data bit. Circuit implementation can be extended to optimize the performance by increasing the length of register 30 or by modifying the weightings based on a fractional dibit period. However, experimental results show that it is not economical to do either one, if price/performance trade-off is the major concern.

In the preferred embodiment, the coding of the two ROMs 32 and 38 is further decomposed into PLA forms for circuit integration purpose.

It should be understood that various alternatives to the embodiment shown herein may be employed in practicing the invention and that circuits within the scope of these claims and their equivalents be covered thereby.

APPENDIX A

```
1000 ' DIFFERENTIAL PSK DECODER **** OCT 83 ***************** DPD.BAS **
1010 WIDTH 255: DEFINT A-Z: DIM L(31)
1020 '***********************************************************
1030 FOR X=0 TO 31
1040    EO =((X AND &H10)\&H10)+1
1050    PH =((X AND &HC )\4) XOR 3
1060    PPH=((X AND &H3 )  ) XOR 3
1070 '***********************************************************
1080    IF PH<PPH THEN PH=PH+4
1090    ON (PH-PPH+1) GOTO 1100,1110,1120,1130
1100        PHO=2: GOTO 1140
1110        PHO=3: GOTO 1140
1120        PHO=1: GOTO 1140
1130        PHO=0
1140    L(X)=(PHO AND EO)\EO
1150 '***********************************************************
1160    PRINT HEX$(X)+"    "+HEX$(L(X))
1170 NEXT
1180 '***********************************************************
1190 OPEN "O",#1,"B:DPD"
1200 FOR X=0 TO 31: PRINT #1,CHR$(L(X));: NEXT: CLOSE: END
```

APPENDIX B

```
1000 ' CONVOLUTION DATA RECOVERY ROM1 ***** OCT 83 ************** CDR1.BAS **
1010 WIDTH 255: DEFINT A-V: DIM S(255): DIM P(6): DIM W(3): DIM X(6)
1020 FOR B=0 TO 3: READ X(B): NEXT
1030 FOR B=4 TO 6: X(B)=X(6-B): NEXT: WT=0
1040 FOR B=0 TO 6: WT=WT+X(B): NEXT: WT=WT/2
1050 FOR L=0 TO 255
1060 '***********************************************************
1070    MSK=&HC0: DMSK=&H40
1080    FOR B=0 TO 6: P(B)=(L AND MSK)\DMSK
1090       IF (P(B)>1) THEN P(B)=P(B) XOR 1
1100       P(B)=P(B)-(B AND 3): IF P(B)<0 THEN P(B)=P(B)+4
1110       MSK=MSK\2: DMSK=DMSK\2
1120    NEXT
1130 '***********************************************************
1140    FOR B=0 TO 3: W(B)=0: NEXT: WMAX=0
1150    FOR B=0 TO 6
1160       W(P(B))=W(P(B))+X(B): IF WMAX<W(P(B)) THEN WMAX=W(P(B)): O=P(B)
1170    NEXT
1180    IF WMAX<WT THEN O=4
1190 '***********************************************************
```

```
1200     S(L)=0
1210     PRINT USING "\ \   ";HEX$(L);: PRINT USING "#      ";O;
1220     FOR B=0 TO 6: PRINT USING "# ";P(B);: NEXT
1230     IF O<>4 THEN PRINT " *"; ELSE PRINT "  ";
1240     PRINT USING "##.####    ";WMAX;
1250     FOR B=0 TO 3: PRINT USING "##.#### ";W(B);: NEXT: PRINT
1260 NEXT
1270 OPEN "O",#1,"B:CDR1"
1280 FOR L=0 TO 255: PRINT #1,CHR$(S(L));: NEXT: CLOSE: END
1290 DATA 1,1.4655,1.8021,1.9552
```

```
1000 ' CONVOLUTION DATA RECOVERY ROM 2 **** OCT 83 ************** CDR2.BAS **
1010 WIDTH 255: DEFINT A-V: DIM S(15)
1020 FOR L=0 TO 15
1030     DO=(L AND &HC )\4
1040     LO=(L AND &H3 )
1050 '***********************************************************************
1060     S(L)=(LO-DO) AND 3
1070 '***********************************************************************
1080     PRINT HEX$(L)+"   "+HEX$(S(L))
1090 NEXT: OPEN "O",#1,"B:CDR2"
1100 FOR L=0 TO 15: PRINT #1,CHR$(S(L));: NEXT: CLOSE: END
```

```
1000 ' IMPULSE RESPONSE V.22 ********** JULY 83 *************** IMPUL.BAS **
1010 WIDTH 255: DEFINT L,T,F: DEFDBL I,C,H: FMAX=524: FCEN=250: TMAX=512
1020 IPI=3.1415926535897796#: DIM I(1023): DIM H(524)
1030 '***********************************************************************
1040 FOR F=0 TO FMAX: IPIF6=IPI*F/600: IPI9=IPI/900
1050     IF F<76 GOTO 1070 ELSE H=COS((F-75)*IPI9)
1060     H(F)=IPIF6/(SIN(IPIF6))*H*H: GOTO 1080
1070     IF F>0 THEN H(F)=IPIF6/(SIN(IPIF6)) ELSE H(F)=1
1080 PRINT F,H(F): NEXT: PRINT "H MATRIX DONE"
1090 '***********************************************************************
1100 FOR T=0 TO (TMAX*2-1): ITP=((T+.5)*IPI)/(TMAX*FCEN): I=.5
1110     FOR F=1 TO FMAX: I=(H(F)*COS(ITP*F))+I: NEXT
1120     IF T>0 THEN I(T)=I/COR ELSE I(0)=1: COR=I
1130 PRINT HEX$(T),I(T),COR: NEXT
1140 '***********************************************************************
1150 OPEN "R",#1,"IMPUL.DAT": T=0
1160     FOR L=1 TO (TMAX*2\16): X$=SPACE$(128): XT$=""
1170        FOR F=0 TO 15: XS$=SPACE$(8): LSET XS$=MKD$(I(T))
1180        XT$=XT$+XS$: T=T+1: NEXT
1190        FIELD #1,128 AS X$: LSET X$=XT$: PUT #1,L
1200     NEXT: CLOSE: END
```

```
1000 ' CDR IMPULSE WEIGHTING ********** OCT 83 ****************** CIW.BAS **
1010 WIDTH 255: DEFINT T,L,F: DEFDBL I,W: TMAX=512: DIM I(TMAX*2-1): DIM W(3)
1020 '***********************************************************************
1030 OPEN "R",#1,"IMPUL.DAT": T=0
1040     FOR L=1 TO (TMAX*2\16): GET #1,L
1050        FOR F=0 TO 127 STEP 8: FIELD #1,F AS F$,8 AS I$
1060        I(T)=CVD(I$): T=T+1: NEXT
1070     NEXT: CLOSE
1080 '***********************************************************************
```

```
1090 W(3)=I(0): W(2)=0: W(1)=0: W(0)=0
1100 FOR T=&H0  TO &H1F: W(3)=W(3)+(I(T)*2): NEXT
1110 FOR T=&H20 TO &H5F: W(2)=W(2)+I(T): NEXT
1120 FOR T=&H60 TO &H9F: W(1)=W(1)+I(T): NEXT
1130 FOR T=&HA0 TO &HDF: W(0)=W(0)+I(T): NEXT
1140 FOR T=1 TO 3: PRINT W(T): W(T)=W(T)/W(0): NEXT: W(0)=1
1150 WT=(W(0)*2)+(W(1)*2)+(W(2)*2)+W(3)
1160 FOR T=0 TO 3: PRINT USING "#.####";W(T): NEXT
1170 PRINT USING "##.####   ";WT,WT/2
```

APPENDIX C

SAMPLE RUN OF CDR1.BAS

| ROM ADR | ROM DAT | INPUT PHASE ARRAY | MAX WEIGHTING | WEIGHTINGS PHSE 0 | PHSE 1 | PHSE 2 | PHSE 3 |
|---|---|---|---|---|---|---|---|
| 0 | 4 | 0 3 2 1 0 3 2 | 2.9310 | 2.8021 | 1.9552 | 2.8021 | 2.9310 |
| 1 | 4 | 0 3 2 1 0 3 3 | 3.9310 | 2.8021 | 1.9552 | 1.8021 | 3.9310 |
| 2 | 4 | 0 3 2 1 0 0 1 | 4.2676 | 4.2676 | 2.9552 | 1.8021 | 1.4655 |
| 3 | 0 | 0 3 2 1 0 0 0 | * 5.2676 | 5.2676 | 1.9552 | 1.8021 | 1.4655 |
| 4 | 4 | 0 3 2 1 1 2 2 | 4.2676 | 1.0000 | 3.7573 | 4.2676 | 1.4655 |
| 5 | 4 | 0 3 2 1 1 2 3 | 3.7573 | 1.0000 | 3.7573 | 3.2676 | 2.4655 |
| 6 | 1 | 0 3 2 1 1 1 1 | * 6.2228 | 1.0000 | 6.2228 | 1.8021 | 1.4655 |
| 7 | 4 | 0 3 2 1 1 1 0 | 5.2228 | 2.0000 | 5.2228 | 1.8021 | 1.4655 |
| 8 | 4 | 0 3 2 2 3 3 2 | 4.7573 | 1.0000 | 0.0000 | 4.7573 | 4.7331 |
| 9 | 3 | 0 3 2 2 3 3 3 | * 5.7331 | 1.0000 | 0.0000 | 3.7573 | 5.7331 |
| A | 4 | 0 3 2 2 3 0 1 | 3.7573 | 2.4655 | 1.0000 | 3.7573 | 3.2676 |
| B | 4 | 0 3 2 2 3 0 0 | 3.7573 | 3.4655 | 0.0000 | 3.7573 | 3.2676 |
| C | 2 | 0 3 2 2 2 2 2 | * 8.0249 | 1.0000 | 0.0000 | 8.0249 | 1.4655 |
| D | 2 | 0 3 2 2 2 2 3 | * 7.0249 | 1.0000 | 0.0000 | 7.0249 | 2.4655 |
| E | 2 | 0 3 2 2 2 1 1 | * 5.5594 | 1.0000 | 2.4655 | 5.5594 | 1.4655 |
| F | 2 | 0 3 2 2 2 1 0 | * 5.5594 | 2.0000 | 1.4655 | 5.5594 | 1.4655 |
| 10 | 4 | 0 3 3 0 0 3 2 | 4.7573 | 4.7573 | 0.0000 | 1.0000 | 4.7331 |
| 11 | 3 | 0 3 3 0 0 3 3 | * 5.7331 | 4.7573 | 0.0000 | 0.0000 | 5.7331 |
| 12 | 0 | 0 3 3 0 0 0 1 | * 6.2228 | 6.2228 | 1.0000 | 0.0000 | 3.2676 |
| 13 | 0 | 0 3 3 0 0 0 0 | * 7.2228 | 7.2228 | 0.0000 | 0.0000 | 3.2676 |
| 14 | 4 | 0 3 3 0 1 2 2 | 3.2676 | 2.9552 | 1.8021 | 2.4655 | 3.2676 |
| 15 | 4 | 0 3 3 0 1 2 3 | 4.2676 | 2.9552 | 1.8021 | 1.4655 | 4.2676 |
| 16 | 4 | 0 3 3 0 1 1 1 | 4.2676 | 2.9552 | 4.2676 | 0.0000 | 3.2676 |
| 17 | 4 | 0 3 3 0 1 1 0 | 3.9552 | 3.9552 | 3.2676 | 0.0000 | 3.2676 |
| 18 | 3 | 0 3 3 3 3 3 2 | * 8.4904 | 1.0000 | 0.0000 | 1.0000 | 8.4904 |
| 19 | 3 | 0 3 3 3 3 3 3 | * 9.4904 | 1.0000 | 0.0000 | 0.0000 | 9.4904 |
| 1A | 3 | 0 3 3 3 3 0 1 | * 7.0249 | 2.4655 | 1.0000 | 0.0000 | 7.0249 |
| 1B | 3 | 0 3 3 3 3 0 0 | * 7.0249 | 3.4655 | 0.0000 | 0.0000 | 7.0249 |
| 1C | 4 | 0 3 3 3 2 2 2 | 5.2228 | 1.0000 | 0.0000 | 4.2676 | 5.2228 |
| 1D | 3 | 0 3 3 3 2 2 3 | * 6.2228 | 1.0000 | 0.0000 | 3.2676 | 6.2228 |
| 1E | 4 | 0 3 3 3 2 1 1 | 5.2228 | 1.0000 | 2.4655 | 1.8021 | 5.2228 |
| 1F | 4 | 0 3 3 3 2 1 0 | 5.2228 | 2.0000 | 1.4655 | 1.8021 | 5.2228 |
| 20 | 4 | 0 0 1 1 0 3 2 | 4.2676 | 4.2676 | 3.7573 | 1.0000 | 1.4655 |
| 21 | 4 | 0 0 1 1 0 3 3 | 4.2676 | 4.2676 | 3.7573 | 0.0000 | 2.4655 |
| 22 | 0 | 0 0 1 1 0 0 1 | * 5.7331 | 5.7331 | 4.7573 | 0.0000 | 0.0000 |
| 23 | 0 | 0 0 1 1 0 0 0 | * 6.7331 | 6.7331 | 3.7573 | 0.0000 | 0.0000 |
| 24 | 1 | 0 0 1 1 1 2 2 | * 5.5594 | 2.4655 | 5.5594 | 2.4655 | 0.0000 |
| 25 | 1 | 0 0 1 1 1 2 3 | * 5.5594 | 2.4655 | 5.5594 | 1.4655 | 1.0000 |
| 26 | 1 | 0 0 1 1 1 1 1 | * 8.0249 | 2.4655 | 8.0249 | 0.0000 | 0.0000 |
| 27 | 1 | 0 0 1 1 1 1 0 | * 7.0249 | 3.4655 | 7.0249 | 0.0000 | 0.0000 |
| 28 | 4 | 0 0 1 2 3 3 2 | 3.2676 | 2.4655 | 1.8021 | 2.9552 | 3.2676 |
| 29 | 4 | 0 0 1 2 3 3 3 | 4.2676 | 2.4655 | 1.8021 | 1.9552 | 4.2676 |
| 2A | 4 | 0 0 1 2 3 0 1 | 3.9310 | 3.9310 | 2.8021 | 1.9552 | 1.8021 |
| 2B | 4 | 0 0 1 2 3 0 0 | 4.9310 | 4.9310 | 1.8021 | 1.9552 | 1.8021 |
| 2C | 2 | 0 0 1 2 2 2 2 | * 6.2228 | 2.4655 | 1.8021 | 6.2228 | 0.0000 |
| 2D | 4 | 0 0 1 2 2 2 3 | 5.2228 | 2.4655 | 1.8021 | 5.2228 | 1.0000 |
| 2E | 4 | 0 0 1 2 2 1 1 | 4.2676 | 2.4655 | 4.2676 | 3.7573 | 0.0000 |
| 2F | 4 | 0 0 1 2 2 1 0 | 3.7573 | 3.4655 | 3.2676 | 3.7573 | 0.0000 |

| | | | | | | | | | | | | |
|---|---|---|---|---|---|---|---|---|---|---|---|---|
| 30 | 0 | 0 | 0 | 0 | 0 | 3 | 2 | * 8.0249 | 8.0249 | 0.0000 | 1.0000 | 1.4655 |
| 31 | 0 | 0 | 0 | 0 | 0 | 3 | 3 | * 8.0249 | 8.0249 | 0.0000 | 0.0000 | 2.4655 |
| 32 | 0 | 0 | 0 | 0 | 0 | 0 | 1 | * 9.4904 | 9.4904 | 1.0000 | 0.0000 | 0.0000 |
| 33 | 0 | 0 | 0 | 0 | 0 | 0 | 0 | *10.4904 | 10.4904 | 0.0000 | 0.0000 | 0.0000 |
| 34 | 0 | 0 | 0 | 0 | 1 | 2 | 2 | * 6.2228 | 6.2228 | 1.8021 | 2.4655 | 0.0000 |
| 35 | 0 | 0 | 0 | 0 | 1 | 2 | 3 | * 6.2228 | 6.2228 | 1.8021 | 1.4655 | 1.0000 |
| 36 | 0 | 0 | 0 | 0 | 1 | 1 | 1 | * 6.2228 | 6.2228 | 4.2676 | 0.0000 | 0.0000 |
| 37 | 0 | 0 | 0 | 0 | 1 | 1 | 0 | * 7.2228 | 7.2228 | 3.2676 | 0.0000 | 0.0000 |
| 38 | 4 | 0 | 0 | 3 | 3 | 3 | 2 | 5.2228 | 4.2676 | 0.0000 | 1.0000 | 5.2228 |
| 39 | 3 | 0 | 0 | 3 | 3 | 3 | 3 | * 6.2228 | 4.2676 | 0.0000 | 0.0000 | 6.2228 |
| 3A | 0 | 0 | 0 | 3 | 3 | 0 | 1 | * 5.7331 | 5.7331 | 1.0000 | 0.0000 | 3.7573 |
| 3B | 0 | 0 | 0 | 3 | 3 | 0 | 0 | * 6.7331 | 6.7331 | 0.0000 | 0.0000 | 3.7573 |
| 3C | 4 | 0 | 0 | 3 | 2 | 2 | 2 | 4.2676 | 4.2676 | 0.0000 | 4.2676 | 1.9552 |
| 3D | 4 | 0 | 0 | 3 | 2 | 2 | 3 | 4.2676 | 4.2676 | 0.0000 | 3.2676 | 2.9552 |
| 3E | 4 | 0 | 0 | 3 | 2 | 1 | 1 | 4.2676 | 4.2676 | 2.4655 | 1.8021 | 1.9552 |
| 3F | 0 | 0 | 0 | 3 | 2 | 1 | 0 | * 5.2676 | 5.2676 | 1.4655 | 1.8021 | 1.9552 |
| 40 | 4 | 1 | 2 | 2 | 1 | 0 | 3 | 2 | 4.2676 | 1.8021 | 2.9552 | 4.2676 | 1.4655 |
| 41 | 4 | 1 | 2 | 2 | 1 | 0 | 3 | 3 | 3.2676 | 1.8021 | 2.9552 | 3.2676 | 2.4655 |
| 42 | 4 | 1 | 2 | 2 | 1 | 0 | 0 | 1 | 3.9552 | 3.2676 | 3.9552 | 3.2676 | 0.0000 |
| 43 | 4 | 1 | 2 | 2 | 1 | 0 | 0 | 0 | 4.2676 | 4.2676 | 2.9552 | 3.2676 | 0.0000 |
| 44 | 2 | 1 | 2 | 2 | 1 | 1 | 2 | 2 | * 5.7331 | 0.0000 | 4.7573 | 5.7331 | 0.0000 |
| 45 | 4 | 1 | 2 | 2 | 1 | 1 | 2 | 3 | 4.7573 | 0.0000 | 4.7573 | 4.7331 | 1.0000 |
| 46 | 1 | 1 | 2 | 2 | 1 | 1 | 1 | 1 | * 7.2228 | 0.0000 | 7.2228 | 3.2676 | 0.0000 |
| 47 | 1 | 1 | 2 | 2 | 1 | 1 | 1 | 0 | * 6.2228 | 1.0000 | 6.2228 | 3.2676 | 0.0000 |
| 48 | 2 | 1 | 2 | 2 | 2 | 3 | 3 | 2 | * 6.2228 | 0.0000 | 1.0000 | 6.2228 | 3.2676 |
| 49 | 4 | 1 | 2 | 2 | 2 | 3 | 3 | 3 | 5.2228 | 0.0000 | 1.0000 | 5.2228 | 4.2676 |
| 4A | 4 | 1 | 2 | 2 | 2 | 3 | 0 | 1 | 5.2228 | 1.4655 | 2.0000 | 5.2228 | 1.8021 |
| 4B | 4 | 1 | 2 | 2 | 2 | 3 | 0 | 0 | 5.2228 | 2.4655 | 1.0000 | 5.2228 | 1.8021 |
| 4C | 2 | 1 | 2 | 2 | 2 | 2 | 2 | 2 | * 9.4904 | 0.0000 | 1.0000 | 9.4904 | 0.0000 |
| 4D | 2 | 1 | 2 | 2 | 2 | 2 | 2 | 3 | * 8.4904 | 0.0000 | 1.0000 | 8.4904 | 1.0000 |
| 4E | 2 | 1 | 2 | 2 | 2 | 2 | 1 | 1 | * 7.0249 | 0.0000 | 3.4655 | 7.0249 | 0.0000 |
| 4F | 2 | 1 | 2 | 2 | 2 | 2 | 1 | 0 | * 7.0249 | 1.0000 | 2.4655 | 7.0249 | 0.0000 |
| 50 | 4 | 1 | 2 | 3 | 0 | 0 | 3 | 2 | 3.7573 | 3.7573 | 1.0000 | 2.4655 | 3.2676 |
| 51 | 4 | 1 | 2 | 3 | 0 | 0 | 3 | 3 | 4.2676 | 3.7573 | 1.0000 | 1.4655 | 4.2676 |
| 52 | 4 | 1 | 2 | 3 | 0 | 0 | 0 | 1 | 5.2228 | 5.2228 | 2.0000 | 1.4655 | 1.8021 |
| 53 | 0 | 1 | 2 | 3 | 0 | 0 | 0 | 0 | * 6.2228 | 6.2228 | 1.0000 | 1.4655 | 1.8021 |
| 54 | 4 | 1 | 2 | 3 | 0 | 1 | 2 | 2 | 3.9310 | 1.9552 | 2.8021 | 3.9310 | 1.8021 |
| 55 | 4 | 1 | 2 | 3 | 0 | 1 | 2 | 3 | 2.9310 | 1.9552 | 2.8021 | 2.9310 | 2.8021 |
| 56 | 1 | 1 | 2 | 3 | 0 | 1 | 1 | 1 | * 5.2676 | 1.9552 | 5.2676 | 1.4655 | 1.8021 |
| 57 | 4 | 1 | 2 | 3 | 0 | 1 | 1 | 0 | 4.2676 | 2.9552 | 4.2676 | 1.4655 | 1.8021 |
| 58 | 3 | 1 | 2 | 3 | 3 | 3 | 3 | 2 | * 7.0249 | 0.0000 | 1.0000 | 2.4655 | 7.0249 |
| 59 | 3 | 1 | 2 | 3 | 3 | 3 | 3 | 3 | * 8.0249 | 0.0000 | 1.0000 | 1.4655 | 8.0249 |
| 5A | 3 | 1 | 2 | 3 | 3 | 3 | 0 | 1 | * 5.5594 | 1.4655 | 2.0000 | 1.4655 | 5.5594 |
| 5B | 3 | 1 | 2 | 3 | 3 | 3 | 0 | 0 | * 5.5594 | 2.4655 | 1.0000 | 1.4655 | 5.5594 |
| 5C | 2 | 1 | 2 | 3 | 3 | 2 | 2 | 2 | * 5.7331 | 0.0000 | 1.0000 | 5.7331 | 3.7573 |
| 5D | 4 | 1 | 2 | 3 | 3 | 2 | 2 | 3 | 4.7573 | 0.0000 | 1.0000 | 4.7331 | 4.7573 |
| 5E | 4 | 1 | 2 | 3 | 3 | 2 | 1 | 1 | 3.7573 | 0.0000 | 3.4655 | 3.2676 | 3.7573 |
| 5F | 4 | 1 | 2 | 3 | 3 | 2 | 1 | 0 | 3.7573 | 1.0000 | 2.4655 | 3.2676 | 3.7573 |
| 60 | 1 | 1 | 1 | 1 | 1 | 0 | 3 | 2 | * 6.2228 | 1.8021 | 6.2228 | 1.0000 | 1.4655 |
| 61 | 1 | 1 | 1 | 1 | 1 | 0 | 3 | 3 | * 6.2228 | 1.8021 | 6.2228 | 0.0000 | 2.4655 |
| 62 | 1 | 1 | 1 | 1 | 1 | 0 | 0 | 1 | * 7.2228 | 3.2676 | 7.2228 | 0.0000 | 0.0000 |
| 63 | 1 | 1 | 1 | 1 | 1 | 0 | 0 | 0 | * 6.2228 | 4.2676 | 6.2228 | 0.0000 | 0.0000 |
| 64 | 1 | 1 | 1 | 1 | 1 | 1 | 2 | 2 | * 8.0249 | 0.0000 | 8.0249 | 2.4655 | 0.0000 |
| 65 | 1 | 1 | 1 | 1 | 1 | 1 | 2 | 3 | * 8.0249 | 0.0000 | 8.0249 | 1.4655 | 1.0000 |
| 66 | 1 | 1 | 1 | 1 | 1 | 1 | 1 | 1 | *10.4904 | 0.0000 | 10.4904 | 0.0000 | 0.0000 |
| 67 | 1 | 1 | 1 | 1 | 1 | 1 | 1 | 0 | * 9.4904 | 1.0000 | 9.4904 | 0.0000 | 0.0000 |
| 68 | 4 | 1 | 1 | 1 | 2 | 3 | 3 | 2 | 4.2676 | 0.0000 | 4.2676 | 2.9552 | 3.2676 |
| 69 | 4 | 1 | 1 | 1 | 2 | 3 | 3 | 3 | 4.2676 | 0.0000 | 4.2676 | 1.9552 | 4.2676 |
| 6A | 1 | 1 | 1 | 1 | 2 | 3 | 0 | 1 | * 5.2676 | 1.4655 | 5.2676 | 1.9552 | 1.8021 |
| 6B | 4 | 1 | 1 | 1 | 2 | 3 | 0 | 0 | 4.2676 | 2.4655 | 4.2676 | 1.9552 | 1.8021 |
| 6C | 2 | 1 | 1 | 1 | 2 | 2 | 2 | 2 | * 6.2228 | 0.0000 | 4.2676 | 6.2228 | 0.0000 |
| 6D | 4 | 1 | 1 | 1 | 2 | 2 | 2 | 3 | 5.2228 | 0.0000 | 4.2676 | 5.2228 | 1.0000 |
| 6E | 1 | 1 | 1 | 1 | 2 | 2 | 1 | 1 | * 6.7331 | 0.0000 | 6.7331 | 3.7573 | 0.0000 |
| 6F | 1 | 1 | 1 | 1 | 2 | 2 | 1 | 0 | * 5.7331 | 1.0000 | 5.7331 | 3.7573 | 0.0000 |

| | | | | | | | | | | | | |
|---|---|---|---|---|---|---|---|---|---|---|---|---|
| 70 | 0 | 1 1 0 0 0 3 2 | * 5.5594 | 5.5594 | 2.4655 | 1.0000 | 1.4655 |
| 71 | 0 | 1 1 0 0 0 3 3 | * 5.5594 | 5.5594 | 2.4655 | 0.0000 | 2.4655 |
| 72 | 0 | 1 1 0 0 0 0 1 | * 7.0249 | 7.0249 | 3.4655 | 0.0000 | 0.0000 |
| 73 | 0 | 1 1 0 0 0 0 0 | * 8.0249 | 8.0249 | 2.4655 | 0.0000 | 0.0000 |
| 74 | 4 | 1 1 0 0 1 2 2 | 4.2676 | 3.7573 | 4.2676 | 2.4655 | 0.0000 |
| 75 | 4 | 1 1 0 0 1 2 3 | 4.2676 | 3.7573 | 4.2676 | 1.4655 | 1.0000 |
| 76 | 1 | 1 1 0 0 1 1 1 | * 6.7331 | 3.7573 | 6.7331 | 0.0000 | 0.0000 |
| 77 | 1 | 1 1 0 0 1 1 0 | * 5.7331 | 4.7573 | 5.7331 | 0.0000 | 0.0000 |
| 78 | 4 | 1 1 0 3 3 3 2 | 5.2228 | 1.8021 | 2.4655 | 1.0000 | 5.2228 |
| 79 | 3 | 1 1 0 3 3 3 3 | * 6.2228 | 1.8021 | 2.4655 | 0.0000 | 6.2228 |
| 7A | 4 | 1 1 0 3 3 0 1 | 3.7573 | 3.2676 | 3.4655 | 0.0000 | 3.7573 |
| 7B | 4 | 1 1 0 3 3 0 0 | 4.2676 | 4.2676 | 2.4655 | 0.0000 | 3.7573 |
| 7C | 4 | 1 1 0 3 2 2 2 | 4.2676 | 1.8021 | 2.4655 | 4.2676 | 1.9552 |
| 7D | 4 | 1 1 0 3 2 2 3 | 3.2676 | 1.8021 | 2.4655 | 3.2676 | 2.9552 |
| 7E | 4 | 1 1 0 3 2 1 1 | 4.9310 | 1.8021 | 4.9310 | 1.8021 | 1.9552 |
| 7F | 4 | 1 1 0 3 2 1 0 | 3.9310 | 2.8021 | 3.9310 | 1.8021 | 1.9552 |
| 80 | 4 | 3 3 2 1 0 3 2 | 3.9310 | 1.8021 | 1.9552 | 2.8021 | 3.9310 |
| 81 | 4 | 3 3 2 1 0 3 3 | 4.9310 | 1.8021 | 1.9552 | 1.8021 | 4.9310 |
| 82 | 4 | 3 3 2 1 0 0 1 | 3.2676 | 3.2676 | 2.9552 | 1.8021 | 2.4655 |
| 83 | 4 | 3 3 2 1 0 0 0 | 4.2676 | 4.2676 | 1.9552 | 1.8021 | 2.4655 |
| 84 | 4 | 3 3 2 1 1 2 2 | 4.2676 | 0.0000 | 3.7573 | 4.2676 | 2.4655 |
| 85 | 4 | 3 3 2 1 1 2 3 | 3.7573 | 0.0000 | 3.7573 | 3.2676 | 3.4655 |
| 86 | 1 | 3 3 2 1 1 1 1 | * 6.2228 | 0.0000 | 6.2228 | 1.8021 | 2.4655 |
| 87 | 4 | 3 3 2 1 1 1 0 | 5.2228 | 1.0000 | 5.2228 | 1.8021 | 2.4655 |
| 88 | 3 | 3 3 2 2 3 3 2 | * 5.7331 | 0.0000 | 0.0000 | 4.7573 | 5.7331 |
| 89 | 3 | 3 3 2 2 3 3 3 | * 6.7331 | 0.0000 | 0.0000 | 3.7573 | 6.7331 |
| 8A | 4 | 3 3 2 2 3 0 1 | 4.2676 | 1.4655 | 1.0000 | 3.7573 | 4.2676 |
| 8B | 4 | 3 3 2 2 3 0 0 | 4.2676 | 2.4655 | 0.0000 | 3.7573 | 4.2676 |
| 8C | 2 | 3 3 2 2 2 2 2 | * 8.0249 | 0.0000 | 0.0000 | 8.0249 | 2.4655 |
| 8D | 2 | 3 3 2 2 2 2 3 | * 7.0249 | 0.0000 | 0.0000 | 7.0249 | 3.4655 |
| 8E | 2 | 3 3 2 2 2 1 1 | * 5.5594 | 0.0000 | 2.4655 | 5.5594 | 2.4655 |
| 8F | 2 | 3 3 2 2 2 1 0 | * 5.5594 | 1.0000 | 1.4655 | 5.5594 | 2.4655 |
| 90 | 3 | 3 3 3 0 0 3 2 | * 5.7331 | 3.7573 | 0.0000 | 1.0000 | 5.7331 |
| 91 | 3 | 3 3 3 0 0 3 3 | * 6.7331 | 3.7573 | 0.0000 | 0.0000 | 6.7331 |
| 92 | 4 | 3 3 3 0 0 0 1 | 5.2228 | 5.2228 | 1.0000 | 0.0000 | 4.2676 |
| 93 | 0 | 3 3 3 0 0 0 0 | * 6.2228 | 6.2228 | 0.0000 | 0.0000 | 4.2676 |
| 94 | 4 | 3 3 3 0 1 2 2 | 4.2676 | 1.9552 | 1.8021 | 2.4655 | 4.2676 |
| 95 | 3 | 3 3 3 0 1 2 3 | * 5.2676 | 1.9552 | 1.8021 | 1.4655 | 5.2676 |
| 96 | 4 | 3 3 3 0 1 1 1 | 4.2676 | 1.9552 | 4.2676 | 0.0000 | 4.2676 |
| 97 | 4 | 3 3 3 0 1 1 0 | 4.2676 | 2.9552 | 3.2676 | 0.0000 | 4.2676 |
| 98 | 3 | 3 3 3 3 3 3 2 | * 9.4904 | 0.0000 | 0.0000 | 1.0000 | 9.4904 |
| 99 | 3 | 3 3 3 3 3 3 3 | *10.4904 | 0.0000 | 0.0000 | 0.0000 | 10.4904 |
| 9A | 3 | 3 3 3 3 3 0 1 | * 8.0249 | 1.4655 | 1.0000 | 0.0000 | 8.0249 |
| 9B | 3 | 3 3 3 3 3 0 0 | * 8.0249 | 2.4655 | 0.0000 | 0.0000 | 8.0249 |
| 9C | 3 | 3 3 3 3 2 2 2 | * 6.2228 | 0.0000 | 0.0000 | 4.2676 | 6.2228 |
| 9D | 3 | 3 3 3 3 2 2 3 | * 7.2228 | 0.0000 | 0.0000 | 3.2676 | 7.2228 |
| 9E | 3 | 3 3 3 3 2 1 1 | * 6.2228 | 0.0000 | 2.4655 | 1.8021 | 6.2228 |
| 9F | 3 | 3 3 3 3 2 1 0 | * 6.2228 | 1.0000 | 1.4655 | 1.8021 | 6.2228 |
| A0 | 4 | 3 0 1 1 0 3 2 | 3.7573 | 3.2676 | 3.7573 | 1.0000 | 2.4655 |
| A1 | 4 | 3 0 1 1 0 3 3 | 3.7573 | 3.2676 | 3.7573 | 0.0000 | 3.4655 |
| A2 | 4 | 3 0 1 1 0 0 1 | 4.7573 | 4.7331 | 4.7573 | 0.0000 | 1.0000 |
| A3 | 0 | 3 0 1 1 0 0 0 | * 5.7331 | 5.7331 | 3.7573 | 0.0000 | 1.0000 |
| A4 | 1 | 3 0 1 1 1 2 2 | * 5.5594 | 1.4655 | 5.5594 | 2.4655 | 1.0000 |
| A5 | 1 | 3 0 1 1 1 2 3 | * 5.5594 | 1.4655 | 5.5594 | 1.4655 | 2.0000 |
| A6 | 1 | 3 0 1 1 1 1 1 | * 8.0249 | 1.4655 | 8.0249 | 0.0000 | 1.0000 |
| A7 | 1 | 3 0 1 1 1 1 0 | * 7.0249 | 2.4655 | 7.0249 | 0.0000 | 1.0000 |
| A8 | 4 | 3 0 1 2 3 3 2 | 4.2676 | 1.4655 | 1.8021 | 2.9552 | 4.2676 |
| A9 | 3 | 3 0 1 2 3 3 3 | * 5.2676 | 1.4655 | 1.8021 | 1.9552 | 5.2676 |
| AA | 4 | 3 0 1 2 3 0 1 | 2.9310 | 2.9310 | 2.8021 | 1.9552 | 2.8021 |
| AB | 4 | 3 0 1 2 3 0 0 | 3.9310 | 3.9310 | 1.8021 | 1.9552 | 2.8021 |
| AC | 2 | 3 0 1 2 2 2 2 | * 6.2228 | 1.4655 | 1.8021 | 6.2228 | 1.0000 |
| AD | 4 | 3 0 1 2 2 2 3 | 5.2228 | 1.4655 | 1.8021 | 5.2228 | 2.0000 |
| AE | 4 | 3 0 1 2 2 1 1 | 4.2676 | 1.4655 | 4.2676 | 3.7573 | 1.0000 |
| AF | 4 | 3 0 1 2 2 1 0 | 3.7573 | 2.4655 | 3.2676 | 3.7573 | 1.0000 |

| | | | | | | | | | | | | |
|---|---|---|---|---|---|---|---|---|---|---|---|---|
| B0 | 0 | 3 | 0 | 0 | 0 | 0 | 3 | 2 | * 7.0249 | 7.0249 | 0.0000 | 1.0000 | 2.4655 |
| B1 | 0 | 3 | 0 | 0 | 0 | 0 | 3 | 3 | * 7.0249 | 7.0249 | 0.0000 | 0.0000 | 3.4655 |
| B2 | 0 | 3 | 0 | 0 | 0 | 0 | 0 | 1 | * 8.4904 | 8.4904 | 1.0000 | 0.0000 | 1.0000 |
| B3 | 0 | 3 | 0 | 0 | 0 | 0 | 0 | 0 | * 9.4904 | 9.4904 | 0.0000 | 0.0000 | 1.0000 |
| B4 | 4 | 3 | 0 | 0 | 0 | 1 | 2 | 2 | 5.2228 | 5.2228 | 1.8021 | 2.4655 | 1.0000 |
| B5 | 4 | 3 | 0 | 0 | 0 | 1 | 2 | 3 | 5.2228 | 5.2228 | 1.8021 | 1.4655 | 2.0000 |
| B6 | 4 | 3 | 0 | 0 | 0 | 1 | 1 | 1 | 5.2228 | 5.2228 | 4.2676 | 0.0000 | 1.0000 |
| B7 | 0 | 3 | 0 | 0 | 0 | 1 | 1 | 0 | * 6.2228 | 6.2228 | 3.2676 | 0.0000 | 1.0000 |
| B8 | 3 | 3 | 0 | 0 | 3 | 3 | 3 | 2 | * 6.2228 | 3.2676 | 0.0000 | 1.0000 | 6.2228 |
| B9 | 3 | 3 | 0 | 0 | 3 | 3 | 3 | 3 | * 7.2228 | 3.2676 | 0.0000 | 0.0000 | 7.2228 |
| BA | 4 | 3 | 0 | 0 | 3 | 3 | 0 | 1 | 4.7573 | 4.7331 | 1.0000 | 0.0000 | 4.7573 |
| BB | 0 | 3 | 0 | 0 | 3 | 3 | 0 | 0 | * 5.7331 | 5.7331 | 0.0000 | 0.0000 | 4.7573 |
| BC | 4 | 3 | 0 | 0 | 3 | 2 | 2 | 2 | 4.2676 | 3.2676 | 0.0000 | 4.2676 | 2.9552 |
| BD | 4 | 3 | 0 | 0 | 3 | 2 | 2 | 3 | 3.9552 | 3.2676 | 0.0000 | 3.2676 | 3.9552 |
| BE | 4 | 3 | 0 | 0 | 3 | 2 | 1 | 1 | 3.2676 | 3.2676 | 2.4655 | 1.8021 | 2.9552 |
| BF | 4 | 3 | 0 | 0 | 3 | 2 | 1 | 0 | 4.2676 | 4.2676 | 1.4655 | 1.8021 | 2.9552 |
| C0 | 2 | 2 | 2 | 2 | 1 | 0 | 3 | 2 | * 5.2676 | 1.8021 | 1.9552 | 5.2676 | 1.4655 |
| C1 | 4 | 2 | 2 | 2 | 1 | 0 | 3 | 3 | 4.2676 | 1.8021 | 1.9552 | 4.2676 | 2.4655 |
| C2 | 4 | 2 | 2 | 2 | 1 | 0 | 0 | 1 | 4.2676 | 3.2676 | 2.9552 | 4.2676 | 0.0000 |
| C3 | 4 | 2 | 2 | 2 | 1 | 0 | 0 | 0 | 4.2676 | 4.2676 | 1.9552 | 4.2676 | 0.0000 |
| C4 | 2 | 2 | 2 | 2 | 1 | 1 | 2 | 2 | * 6.7331 | 0.0000 | 3.7573 | 6.7331 | 0.0000 |
| C5 | 2 | 2 | 2 | 2 | 1 | 1 | 2 | 3 | * 5.7331 | 0.0000 | 3.7573 | 5.7331 | 1.0000 |
| C6 | 1 | 2 | 2 | 2 | 1 | 1 | 1 | 1 | * 6.2228 | 0.0000 | 6.2228 | 4.2676 | 0.0000 |
| C7 | 4 | 2 | 2 | 2 | 1 | 1 | 1 | 0 | 5.2228 | 1.0000 | 5.2228 | 4.2676 | 0.0000 |
| C8 | 2 | 2 | 2 | 2 | 3 | 3 | 3 | 2 | * 7.2228 | 0.0000 | 0.0000 | 7.2228 | 3.2676 |
| C9 | 2 | 2 | 2 | 2 | 3 | 3 | 3 | 3 | * 6.2228 | 0.0000 | 0.0000 | 6.2228 | 4.2676 |
| CA | 2 | 2 | 2 | 2 | 3 | 3 | 0 | 1 | * 6.2228 | 1.4655 | 1.0000 | 6.2228 | 1.8021 |
| CB | 2 | 2 | 2 | 2 | 3 | 3 | 0 | 0 | * 6.2228 | 2.4655 | 0.0000 | 6.2228 | 1.8021 |
| CC | 2 | 2 | 2 | 2 | 2 | 2 | 2 | 2 | *10.4904 | 0.0000 | 0.0000 | 10.4904 | 0.0000 |
| CD | 2 | 2 | 2 | 2 | 2 | 2 | 2 | 3 | * 9.4904 | 0.0000 | 0.0000 | 9.4904 | 1.0000 |
| CE | 2 | 2 | 2 | 2 | 2 | 2 | 1 | 1 | * 8.0249 | 0.0000 | 2.4655 | 8.0249 | 0.0000 |
| CF | 2 | 2 | 2 | 2 | 2 | 2 | 1 | 0 | * 8.0249 | 1.0000 | 1.4655 | 8.0249 | 0.0000 |
| D0 | 4 | 2 | 2 | 3 | 0 | 0 | 3 | 2 | 3.7573 | 3.7573 | 0.0000 | 3.4655 | 3.2676 |
| D1 | 4 | 2 | 2 | 3 | 0 | 0 | 3 | 3 | 4.2676 | 3.7573 | 0.0000 | 2.4655 | 4.2676 |
| D2 | 4 | 2 | 2 | 3 | 0 | 0 | 0 | 1 | 5.2228 | 5.2228 | 1.0000 | 2.4655 | 1.8021 |
| D3 | 0 | 2 | 2 | 3 | 0 | 0 | 0 | 0 | * 6.2228 | 6.2228 | 0.0000 | 2.4655 | 1.8021 |
| D4 | 4 | 2 | 2 | 3 | 0 | 1 | 2 | 2 | 4.9310 | 1.9552 | 1.8021 | 4.9310 | 1.8021 |
| D5 | 4 | 2 | 2 | 3 | 0 | 1 | 2 | 3 | 3.9310 | 1.9552 | 1.8021 | 3.9310 | 2.8021 |
| D6 | 4 | 2 | 2 | 3 | 0 | 1 | 1 | 1 | 4.2676 | 1.9552 | 4.2676 | 2.4655 | 1.8021 |
| D7 | 4 | 2 | 2 | 3 | 0 | 1 | 1 | 0 | 3.2676 | 2.9552 | 3.2676 | 2.4655 | 1.8021 |
| D8 | 3 | 2 | 2 | 3 | 3 | 3 | 3 | 2 | * 7.0249 | 0.0000 | 0.0000 | 3.4655 | 7.0249 |
| D9 | 3 | 2 | 2 | 3 | 3 | 3 | 3 | 3 | * 8.0249 | 0.0000 | 0.0000 | 2.4655 | 8.0249 |
| DA | 3 | 2 | 2 | 3 | 3 | 3 | 0 | 1 | * 5.5594 | 1.4655 | 1.0000 | 2.4655 | 5.5594 |
| DB | 3 | 2 | 2 | 3 | 3 | 3 | 0 | 0 | * 5.5594 | 2.4655 | 0.0000 | 2.4655 | 5.5594 |
| DC | 2 | 2 | 2 | 3 | 3 | 2 | 2 | 2 | * 6.7331 | 0.0000 | 0.0000 | 6.7331 | 3.7573 |
| DD | 2 | 2 | 2 | 3 | 3 | 2 | 2 | 3 | * 5.7331 | 0.0000 | 0.0000 | 5.7331 | 4.7573 |
| DE | 4 | 2 | 2 | 3 | 3 | 2 | 1 | 1 | 4.2676 | 0.0000 | 2.4655 | 4.2676 | 3.7573 |
| DF | 4 | 2 | 2 | 3 | 3 | 2 | 1 | 0 | 4.2676 | 1.0000 | 1.4655 | 4.2676 | 3.7573 |
| E0 | 4 | 2 | 1 | 1 | 1 | 0 | 3 | 2 | 5.2228 | 1.8021 | 5.2228 | 2.0000 | 1.4655 |
| E1 | 4 | 2 | 1 | 1 | 1 | 0 | 3 | 3 | 5.2228 | 1.8021 | 5.2228 | 1.0000 | 2.4655 |
| E2 | 1 | 2 | 1 | 1 | 1 | 0 | 0 | 1 | * 6.2228 | 3.2676 | 6.2228 | 1.0000 | 0.0000 |
| E3 | 4 | 2 | 1 | 1 | 1 | 0 | 0 | 0 | 5.2228 | 4.2676 | 5.2228 | 1.0000 | 0.0000 |
| E4 | 1 | 2 | 1 | 1 | 1 | 1 | 2 | 2 | * 7.0249 | 0.0000 | 7.0249 | 3.4655 | 0.0000 |
| E5 | 1 | 2 | 1 | 1 | 1 | 1 | 2 | 3 | * 7.0249 | 0.0000 | 7.0249 | 2.4655 | 1.0000 |
| E6 | 1 | 2 | 1 | 1 | 1 | 1 | 1 | 1 | * 9.4904 | 0.0000 | 9.4904 | 1.0000 | 0.0000 |
| E7 | 1 | 2 | 1 | 1 | 1 | 1 | 1 | 0 | * 8.4904 | 1.0000 | 8.4904 | 1.0000 | 0.0000 |
| E8 | 4 | 2 | 1 | 1 | 2 | 3 | 3 | 2 | 3.9552 | 0.0000 | 3.2676 | 3.9552 | 3.2676 |
| E9 | 4 | 2 | 1 | 1 | 2 | 3 | 3 | 3 | 4.2676 | 0.0000 | 3.2676 | 2.9552 | 4.2676 |
| EA | 4 | 2 | 1 | 1 | 2 | 3 | 0 | 1 | 4.2676 | 1.4655 | 4.2676 | 2.9552 | 1.8021 |
| EB | 4 | 2 | 1 | 1 | 2 | 3 | 0 | 0 | 3.2676 | 2.4655 | 3.2676 | 2.9552 | 1.8021 |
| EC | 2 | 2 | 1 | 1 | 2 | 2 | 2 | 2 | * 7.2228 | 0.0000 | 3.2676 | 7.2228 | 0.0000 |
| ED | 2 | 2 | 1 | 1 | 2 | 2 | 2 | 3 | * 6.2228 | 0.0000 | 3.2676 | 6.2228 | 1.0000 |
| EE | 1 | 2 | 1 | 1 | 2 | 2 | 1 | 1 | * 5.7331 | 0.0000 | 5.7331 | 4.7573 | 0.0000 |
| EF | 4 | 2 | 1 | 1 | 2 | 2 | 1 | 0 | 4.7573 | 1.0000 | 4.7331 | 4.7573 | 0.0000 |

```
F0  0    2 1 0 0 0 3 2  * 5.9594    5.9594  1.4655  2.0000  1.4655
F1  0    2 1 0 0 0 3 3  * 5.9594    5.9594  1.4655  1.0000  2.4655
F2  0    2 1 0 0 0 0 1  * 7.0249    7.0249  2.4655  1.0000  0.0000
F3  0    2 1 0 0 0 0 0  * 8.0249    8.0249  1.4655  1.0000  0.0000
F4  4    2 1 0 0 1 2 2    3.7573    3.7573  3.2676  3.4655  0.0000
F5  4    2 1 0 0 1 2 3    3.7573    3.7573  3.2676  2.4655  1.0000
F6  1    2 1 0 0 1 1 1  * 5.7331    3.7573  5.7331  1.0000  0.0000
F7  4    2 1 0 0 1 1 0    4.7573    4.7573  4.7331  1.0000  0.0000
F8  4    2 1 0 3 3 3 2    5.2228    1.8021  1.4655  2.0000  5.2228
F9  3    2 1 0 3 3 3 3  * 6.2228    1.8021  1.4655  1.0000  6.2228
FA  4    2 1 0 3 3 0 1    3.7573    3.2676  2.4655  1.0000  3.7573
FB  4    2 1 0 3 3 0 0    4.2676    4.2676  1.4655  1.0000  3.7573
FC  2    2 1 0 3 2 2 2  * 5.2676    1.8021  1.4655  5.2676  1.9552
FD  4    2 1 0 3 2 2 3    4.2676    1.8021  1.4655  4.2676  2.9552
FE  4    2 1 0 3 2 1 1    3.9310    1.8021  3.9310  2.8021  1.9552
FF  4    2 1 0 3 2 1 0    2.9310    2.8021  2.9310  2.8021  1.9552
```

NOTE:

1. Number designated by "*" depicts weighting exceeding half of total weighting, the corresponding phase is being selected as the output phase.

2. If rom data=4, the output phase is not valid and the decoded phase at the outputs of Ic-2E will remain unchanged.

What is claimed is:

1. A data recovery circuit of the type utilized in a receiver circuit to generate decoded data signals from an incoming signal which comprises a phase modulated carrier signal, the data recovery circuit comprising:
   (a) means for converting the incoming signal to a corresponding binary signal;
   (b) means for recovering a carrier clock signal from the incoming signal, the carrier clock having a frequency greater than that of the incoming signal;
   (c) a shift register which responds to the carrier clock signal to provide an array of phase vectors based on the binary signal which is shifted into the shift register;
   (d) means for convoluting the phase vectors against a weighting curve to generate a weighted output; and
   (e) means for removing the phase of the carrier signal from the weighted output to generate a decoded data signal representative of the difference between the phase of the incoming signal and the phase of the carrier signal.

2. A data recovery circuit as in claim 1 and further including means for preventing invalid data signals from leaving the data recovery circuit.

3. A data recovery circuit as in claim 1 wherein the decoded data signal are asynchronous to the incoming signal.

4. A data recovery circuit of the type utilized in a receiver circuit for recovering data signals from an incoming differentially encoded dibit phase shift keying (DBPSK) signal, the data recovery circuit comprising:
   (a) means for converting the incoming DBPSK signal to a corresponding binary signal;
   (b) means for recovering a carrier clock signal from the incoming DBPSK signal, the carrier clock having a predetermined phase relationship to the incoming signal;
   (c) a multibit shift register which shifts in the binary signal in response to the carrier clock signal and generates corresponding multibit phase vector arrays as outputs; and
   (d) means for storing a weighting curve, the phase vector array output of the shift register serving to address the storage means such that the phase vector array output is convoluted against the weighting curve to provide a weighted output which represents the phase of the incoming DBPSK signal at a corresponding interval.

5. A data recovery circuit as in claim 4 wherein the weighted output is asynchronous to the incoming DBPSK signal.

6. A data recovery circuit of the type utilized in a receiver circuit for recovering data signals from an incoming differentially encoded dibit phase shift keying (DBPSK) signal having a fixed carrier phase, the data recovery circuit comprising:
   (a) means for converting the incoming DBPSK signal to a corresponding binary signal;
   (b) means for recovering a carrier clock signal from the incoming DBPSK signal, the recovered carrier clock signal having a predetermined phase relationship to the incoming DBPSK signal;
   (c) a multibit shift register which shifts in the binary signal in response to the recovered carrier clock signal and generates corresponding multibit phase vector arrays;
   (d) means for storing a weighting curve, the phase vector arrays serving to address the storage means such that the phase vector arrays are convoluted against the weighting curve to provide a decoded data output having rotating phase pattern which rotates at the rate of the recovered carrier clock signal; and
   (e) means for removing the rotating phase pattern from the decoded output by determining the phase difference between decoded output and the recovered carrier clock signal to provide a recovered dibit data signal.

7. A data recovery circuit as in claim 6 wherein the recovered dibit data signal is asynchronous to the incoming DBPSK signal.

8. A data recovery circuit as in claim 6 and further including means for checking whether the maximum weighting applied to the phase vector array exceeds a predetermined point and, in the event the predetermined point is exceeded, for providing a preselected decoded output.

9. A data recovery circuit as in claim 8 and further including means responsive to the preselected decoded output to prevent an invalid data signal from leaving the data recovery circuit.

* * * * *